US009528618B2

(12) United States Patent
Hayes (10) Patent No.: US 9,528,618 B2
(45) Date of Patent: Dec. 27, 2016

(54) FILTER ASSEMBLY

(75) Inventor: Michael S. Hayes, Homer Glen, IL (US)

(73) Assignee: ILLINOIS TOOL WORKS, INC., Glenview, IL (US)

(*) Notice: Subject to any disclaimer, the term of this patent is extended or adjusted under 35 U.S.C. 154(b) by 804 days.

(21) Appl. No.: 13/696,394

(22) PCT Filed: Jul. 11, 2011

(86) PCT No.: PCT/US2011/043593
§ 371 (c)(1),
(2), (4) Date: Nov. 6, 2012

(87) PCT Pub. No.: WO2012/009287
PCT Pub. Date: Jan. 19, 2012

(65) Prior Publication Data
US 2013/0068323 A1 Mar. 21, 2013

Related U.S. Application Data

(60) Provisional application No. 61/363,493, filed on Jul. 12, 2010, provisional application No. 61/380,479, filed on Sep. 7, 2010.

(51) Int. Cl.
*F16K 1/14* (2006.01)
*F16K 15/04* (2006.01)
*B29C 45/16* (2006.01)
*B60T 8/36* (2006.01)
*B29C 45/00* (2006.01)

(52) U.S. Cl.
CPC .......... *F16K 15/04* (2013.01); *B29C 45/0003* (2013.01); *B29C 45/16* (2013.01); *B60T 8/3615* (2013.01); *F16K 15/048* (2013.01); *Y10T 137/7837* (2015.04)

(58) Field of Classification Search
CPC ..... E03C 1/104; F16K 15/048; Y10T 137/791
USPC ............ 137/549, 550, 533.19, 519.5, 533.11
See application file for complete search history.

(56) References Cited

U.S. PATENT DOCUMENTS 4,945,947 A * 8/1990 Westra et al. .............. 137/519.5
6,276,909 B1 * 8/2001 Siegel et al. .................. 417/549
6,343,916 B1 2/2002 Bougamont et al.
(Continued)

FOREIGN PATENT DOCUMENTS

CN 1269000 A 10/2000
CN 1864975 A 11/2006
(Continued)

OTHER PUBLICATIONS

An International Search Report, dated Jan. 26, 2012, issued in International Application No. PCT/US2011/043593.

*Primary Examiner* — Kevin Lee
*Assistant Examiner* — P. Macade Nichols
(74) *Attorney, Agent, or Firm* — Hauptman Ham, LLP (57) ABSTRACT

A check valve filter assembly is configured to be used with an isolation cartridge of an anti-lock braking system. The check valve filter assembly includes a main body formed of a first material. The main body includes an internal check valve bore. The assembly also includes a separate and distinct bore insert formed of a second material that differs from the first material. The bore insert may be secured over a surface of the internal check valve bore. The bore insert is configured to sealingly engage a check ball.

24 Claims, 5 Drawing Sheets

(56) References Cited

U.S. PATENT DOCUMENTS

| | | |
|---|---|---|
| 6,382,250 B1 | 5/2002 | Gruschwitz et al. |
| 6,832,479 B2 | 12/2004 | Nakagawa et al. |
| 7,104,277 B2 * | 9/2006 | Hernandez ............ F16K 17/194 |
| | | 137/493.1 |
| 2006/0099298 A1 | 5/2006 | Hayes et al. |
| 2006/0112995 A1 | 6/2006 | Kwon |

FOREIGN PATENT DOCUMENTS

| | | |
|---|---|---|
| DE | 19830078 A1 | 1/2000 |
| DE | 19955888 A1 | 5/2001 |
| DE | 100 19 403 A1 | 10/2001 |
| DE | 102004045116 A1 | 6/2006 |
| EP | 1203706 A2 | 5/2002 |
| EP | 1655123 A1 | 5/2006 |
| JP | 2000145990 A | 5/2000 |

\* cited by examiner

FILTER ASSEMBLY

RELATED APPLICATIONS

This application relates to and claims priority benefits from U.S. Provisional Patent Application No. 61/363,493 entitled "Filter Assembly," filed Jul. 12, 2010, and U.S. Provisional Patent Application No. 61/380,479 entitled "Filter Assembly," filed Sep. 7, 2010, both of which are hereby incorporated by reference in their entireties.

FIELD OF EMBODIMENTS OF THE INVENTION

Embodiments of the present invention generally relate to a filter assembly, and more particularly to a check valve filter assembly.

BACKGROUND

Various vehicles include an anti-lock braking system (ABS)/traction control/vehicle stability control module, or an ABS/hydraulic control unit (HCU). Most, if not all, ABS/HCUs have multiple isolation cartridges that are operatively connected to the wheels. For example, a standard automobile includes four isolation cartridges, with each isolation cartridge operatively connected to a respective wheel.

Each isolation cartridge allows brake fluid from a master cylinder to pass to the brakes during normal vehicle operation. During normal operation, the cartridge is open. However, during an ABS event, the cartridge closes to isolate the master cylinder from the brakes. The closing of the cartridge prevents the wheel from locking.

Figure 1:
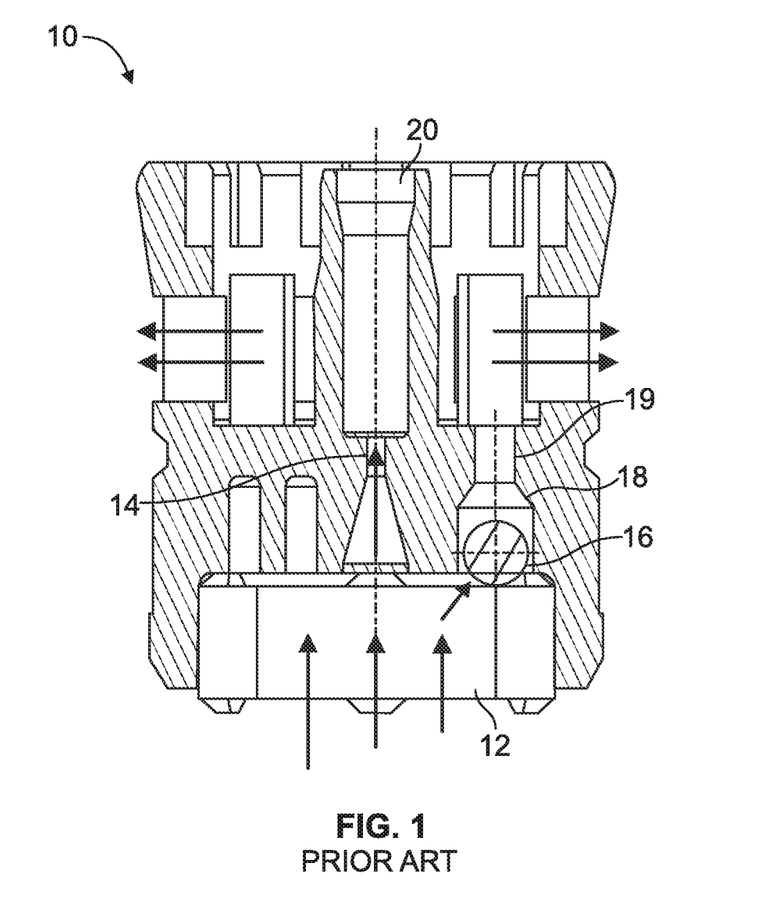
FIG. 1 illustrates an axial cross-sectional view of a check filter assembly.

FIG. 1 illustrates an axial cross-sectional view of a check filter assembly 10. The assembly 10 is typically contained within an isolation cartridge. During operation, brake fluid first passes through an inlet filter 12. The inlet filter 12 is configured to prevent contaminants from clogging a critical orifice and sealing surface of the assembly 10. The fluid then passes through a center orifice 14 of the assembly 10. At the same time, the inlet fluid also forces a check ball 16 against an angular sealing surface 18 that defines a portion of a bore 19.

In general, the sealing surface 18 needs to be robust enough to prevent any brake fluid from leaking past the check ball 16 when the fluid pressure forces the check ball 16 against the sealing surface 18.

As shown in FIG. 1, a tappet is positioned in a tappet bore 20. The tappet is generally a plastic cylindrical rod that closes above the center orifice 14. When the tappet closes, the brake fluid pressure is high. The inlet side of the assembly may need to withstand pressure around 350 bars (5075 psi) when the tappet is in the closed position. The pressure forces the check ball 16 against the angled sealing surface 18.

However, it has been found that manufacturing an assembly having an acceptable sealing surface on all parts is difficult. Typically, the sealing material is composed of a material that is capable of withstanding brake fluid pressure applied to the inside walls of the assembly. However, when a part is being molded, it is difficult to control how carbon or glass fibers of the material orient themselves. Therefore, the fibers can potentially orient themselves in such a way that creates a leak path on certain parts, while not causing a leak path on other parts.

SUMMARY OF EMBODIMENTS OF THE INVENTION

Certain embodiments of the present invention provide a check valve filter assembly configured to be used with an isolation cartridge of an ABS system. The assembly includes a main body and a separate and distinct bore insert.

The main body is formed of a first material and includes an internal check valve bore. The bore insert is formed of a second material that differs from the first material. The bore insert is secured over a surface of the internal check valve bore. The bore insert is configured to sealingly engage a check ball.

The first material may be a first plastic, while the second material may be a second plastic.

The bore insert may include an insert body that conforms to the surface of the internal check valve bore. The insert body defines a central channel having a mouth that connects to a beveled intermediate portion that in turn connects to a reduced diameter portion.

The bore insert may include an insert body defining a central channel having a mouth that directly connects to a reduced diameter portion.

Certain embodiments of the present invention provide a method of forming a check valve filter assembly of an isolation cartridge of an anti-lock brake system. The method includes injecting a first material into a first mold, forming a bore insert through the injecting a first material into a first mold. The bore insert is then removed from the first mold, and placed into a second mold for a main body. A filter screen is placed in an appropriate location in the second mold. A second material is then inserted into the second mold with the bore insert and filter screen embedded therein.

Certain embodiments of the present invention also provide a method of forming a check filter assembly of an isolation cartridge of an anti-lock brake system. The method includes injecting a first material into a first mold, forming a main body through the injecting a first material into a first mold, removing the main body from the first mold, positioning a masking member over an entirety of the main body except for at least a portion of an internal bore of the main body, securing a second mold to the at least a portion of the internal bore of the main body, injecting a second material into the second mold, and forming a bore insert through the injecting a second material into the second mold. The method may also include removing the masking member from the main body, and removing the second mold.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

Figure 2:
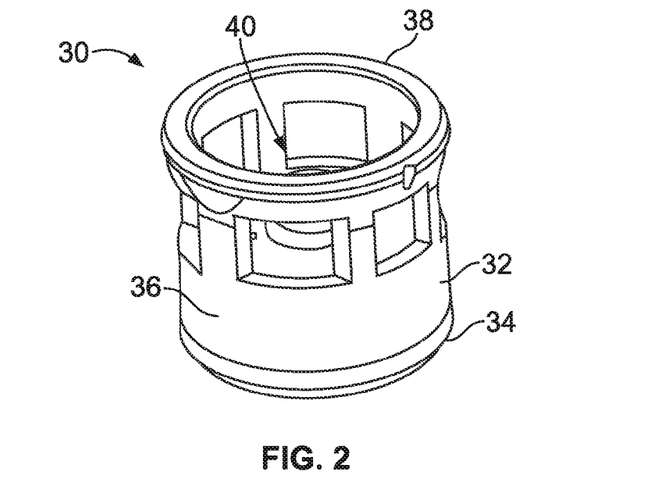
FIG. 2 illustrates an isometric top view of a filter assembly, according to an embodiment of the present invention.
Figure 3:
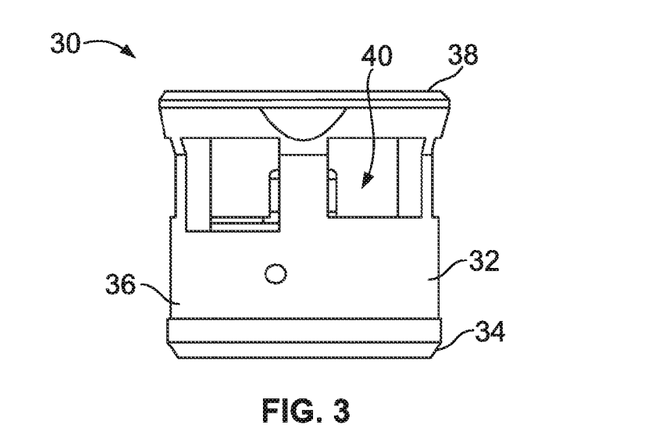
FIG. 3 illustrates a front view of a filter assembly, according to an embodiment of the present invention.

FIGS. 2 and 3 illustrate isometric top and front views, respectively, of a filter assembly 30, according to an embodiment of the present invention. The filter assembly 30 is configured to be part of an isolation cartridge of an ABS/HCU, for example. The filter assembly 30 may be formed of a molded plastic.

The filter assembly 30 includes a main body 32 that may be formed of 20% carbon-filled polyamide (PA) 6/6. As such, it has been found that this material provides the main body 32 the ability to withstand high fluid pressures.

The main body 32 includes a base 34 supporting a cylindrical wall 36 having an upper rim 38, defining a recessed chamber 40.

Figure 4:
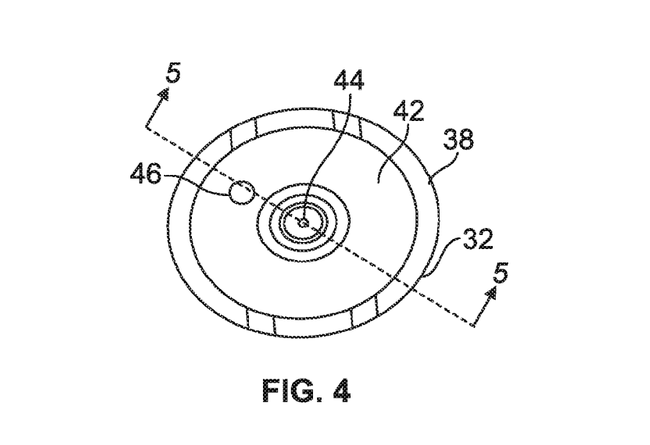
FIG. 4 illustrates a top plan view of a filter assembly, according to an embodiment of the present invention.

FIG. 4 illustrates a top plan view of the filter assembly 30. As shown in FIG. 4, an interior upper wall 42 is defined within the cylindrical wall 36 below the rim 38. A tappet within a bore 44 (hereafter tappet 44) is formed over a center orifice (hidden from view), while a check valve bore 46 is positioned radially away from the center orifice.

Figure 5:
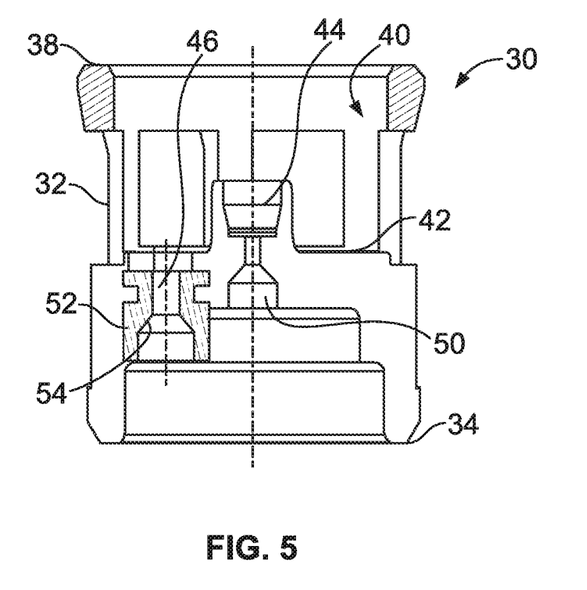
FIG. 5 illustrates an axial cross-sectional view of a filter assembly through line 5-5 of FIG. 4, according to an embodiment of the present invention.

FIG. 5 illustrates an axial cross-sectional view of the filter assembly 30 through line 5-5 of FIG. 4, according to an embodiment of the present invention. As shown in FIG. 5, the tappet 44 is positioned over a center orifice 50.

Additionally, a bore insert 52 is secured over an interior surface 54 of the check valve bore 46. The bore insert 52 is inserted during the molding process of the main body 32. As such, the bore insert 52 defines a sealing surface over the interior surface 54. That is, the bore insert 52 overlays the fibers of the interior surface 54 of the check valve bore 46.

Figure 6:
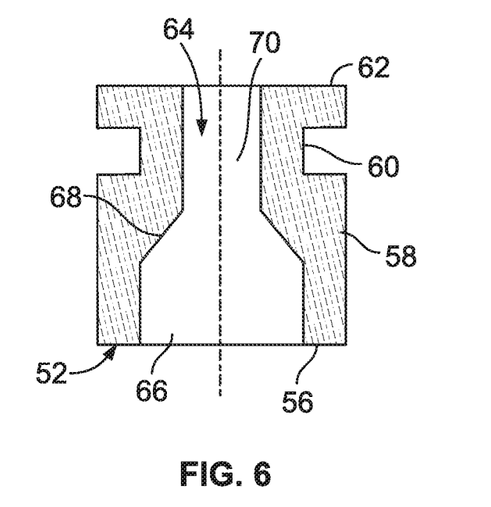
FIG. 6 illustrates an axial cross-sectional view of a bore insert, according to an embodiment of the present invention.

FIG. 6 illustrates an axial cross-sectional view of the bore insert 52. The bore insert 52 is formed to fit over the interior surface 54 of the check valve bore 46. The bore insert 52 includes a base 56 integrally formed with an upstanding wall 58, which, in turn, is integrally formed with a recessed neck 60, which, in turn, is integrally formed with a cap 62. A central channel 64 is formed through the bore insert 52. A wide mouth 66 is defined at a lower end of the channel 64. The mouth 66 connects to a beveled intermediate portion 68 that constricts the channel 64 toward a reduced diameter upper portion 70. As shown in FIG. 6, the diameter of the mouth 66 is greater than that of the intermediate portion 68.

Further, the diameter of the intermediate portion 68 is greater than that of the upper portion 70. In this manner, a check ball that is retained within the mouth 66 does not pass into the upper portion 70 of the channel 64.

Unlike the main body 32 (shown in FIGS. 2-5), the bore insert 52 is formed of unfilled PA 6/6. It has been found that unfilled PA 6/6 provides greater sealing ability than the 20% carbon-filled PA 6/6 that forms the main body 32. Thus, the sealing surface defined by the bore insert 52 is able to prevent leaks better than an assembly without the bore insert 52, while the main body 32 is formed of the stronger 20% carbon-filled PA 6/6, which is capable of withstanding high fluid pressures.

Figure 7:
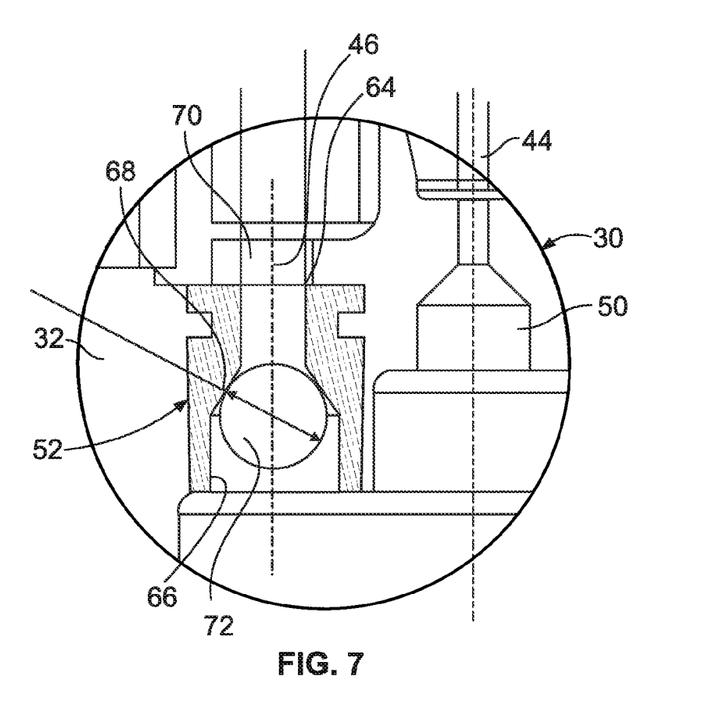
FIG. 7 illustrates a close-up cross-sectional view of a bore insert secured within a filter assembly, according to an embodiment of the present invention.

FIG. 7 illustrates a close-up cross-sectional view of the bore insert 52 secured within the filter assembly 30. As shown, fluid pressure forces a check ball 72 to seat against the intermediate portion 68, which defines the sealing surface between the check ball 72 and the bore insert 52. The diameter of the check ball 72 is larger than the diameter of the upper portion 70 of the channel 64. As such, fluid pressure lodges the check ball 72 against the intermediate portion 68 of the bore insert 52, thereby preventing any leaks between the outer surface of the check ball 72 and the intermediate portion 68 of the bore insert 52.

Figure 8:
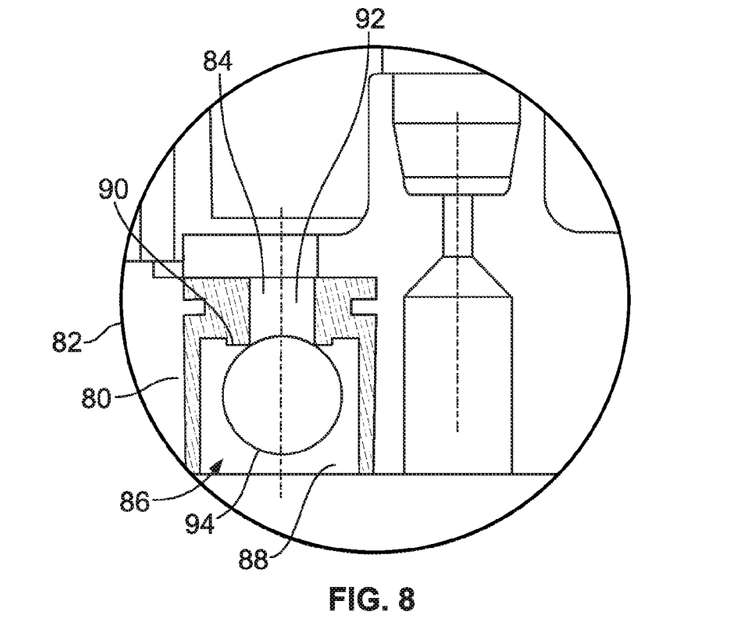
FIG. 8 illustrates a close-up cross-sectional view of a bore insert secured within a filter assembly, according to an embodiment of the present invention.

FIG. 8 illustrates a close-up cross-sectional view of a bore insert 80 secured within a filter assembly 82, according to an embodiment of the present invention. The bore insert 80 is similar to the bore insert 52, except that it is sized to fit within the bore 84 of the assembly 82. Similarly, the bore insert 80 includes a channel 86 having a wide mouth 88. A hollow stud 90 extends downwardly from an upper portion 92 of the channel 86. With increased fluid pressure, a check ball 94 is forced into the stud 90, but is unable to pass therein.

Figure 9:
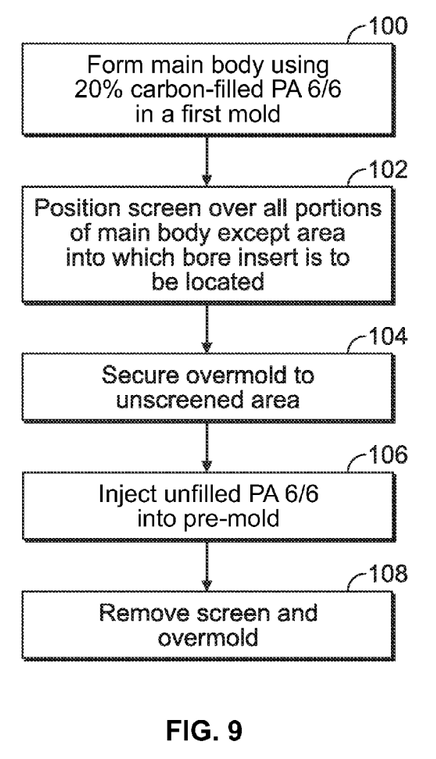
FIG. 9 illustrates a flow chart of a process of manufacturing a filter assembly, according to an embodiment of the present invention.

FIG. 9 illustrates a flow chart of a process of manufacturing a filter assembly, according to an embodiment of the present invention. At 100, the main body of the assembly is formed with 20% carbon-filled PA 6/6. For example, the 20% carbon-filled PA 6/6 may be injected into a first mold. When the injected material cools, the first mold is removed to yield the main body.

At 102, a screen or other masking agent is positioned over all portions of the main body except for the area into which the bore insert is to be located. Then, an overmold, or second mold, is secured to the unscreened area at 104. Another injection unit may then inject the unfilled PA 6/6 into the overmold at 106, thereby defining the bore insert. After the injected material cools, the screen and overmold are removed at 108. In this manner, a filter assembly according to embodiments of the present invention may be formed.

Figure 10:
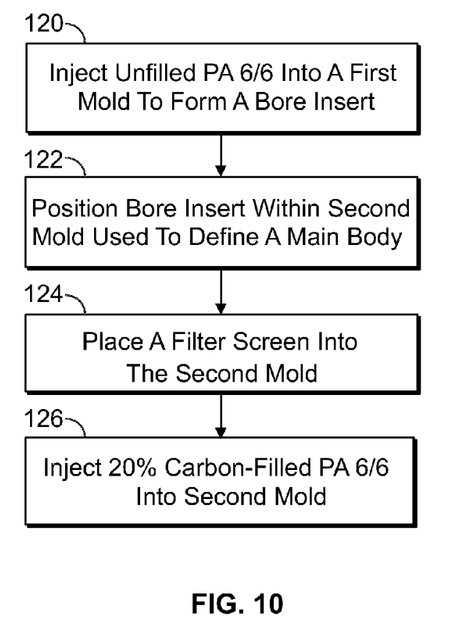
FIG. 10 illustrates a flow chart of a process of manufacturing a filter assembly, according to an embodiment of the present invention.

FIG. 10 illustrates a flow chart of a process of manufacturing a filter assembly, according to an embodiment of the present invention. At 120, unfilled PA 6/6 is injected into a first mold to form a bore insert. Once the unfilled PA 6/6 cools and hardens, the bore insert is removed from the first mold.

At 122, the bore insert is then positioned within an appropriate location of a second mold used to define a main body of the assembly. At 124, a filter screen is placed in the appropriate location in the second mold. At 125, 20% carbon-filled PA 6/6 may be injected into the second mold having the bore insert and filter screen embedded therein. After the carbon filled PA 6/6 cools and hardens, the main body, having the embedded bore insert, is removed.

Thus, embodiments of the present invention provide a filter assembly and method of forming the same that includes a main body formed of 20% carbon-filled PA 6/6, and a separate and distinct bore insert that is formed of unfilled PA 6/6. As discussed above, the bore insert is overmolded onto an interior surface of a bore channel of the main body. Accordingly, the channel formed through the bore insert defines the actual sealing surface of the assembly.

The vast majority of the assembly is formed of 20% carbon-filled PA 6/6 to ensure strength, while a small portion overlaying at least a portion of a check valve bore within the main body is overmolded with the bore insert formed of unfilled PA 6/6. As noted above, the unfilled PA 6/6 provides greater sealing ability than the 20% carbon-filled PA 6/6.

Unlike conventional check valve filter assemblies, embodiments of the present invention provide a system and method of forming a check valve filter assembly that has a sealing surface that consistently prevents leaks over a long period of time.

While various spatial and directional terms, such as top, bottom, lower, mid, lateral, horizontal, vertical, front and the like may be used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A check valve filter assembly configured to be used with an isolation cartridge, the check valve filter assembly comprising:
   a main body formed of a first material, said main body comprising an internal check valve bore; and
   a separate and distinct bore insert formed of a second material that differs from said first material, said bore insert secured over a surface of said internal check valve bore, wherein said bore insert is configured to sealingly engage a check ball.

2. The check valve filter assembly of claim 1, wherein said first material is a first plastic, and said second material is a second plastic.

3. The check valve filter assembly of claim 1, wherein said first material is 20% carbon-filled PA 6/6, and said second material is unfilled PA 6/6.

4. The check valve filter assembly of claim 1, wherein said bore insert comprises an insert body that conforms to said surface of said internal check valve bore, and wherein said insert body defining a central channel having a mouth that connects to a beveled intermediate portion that in turn connects to a reduced diameter portion.

5. The check valve filter assembly of claim 1, wherein said bore insert comprises an insert body defining a central channel having a mouth that connects to a reduced diameter portion.

6. An assembly, comprising:
   an isolation cartridge of an ABS/HCU, wherein the isolation cartridge includes the check valve filter assembly of claim 1 wherein said first material is a first plastic, and said second material is a second plastic.

7. The check valve filter assembly of claim 1, further comprising an orifice in the main body, wherein the bore insert is located radially away from the orifice.

8. The check valve filter assembly of claim 1, wherein the main body has a longitudinal axis, and the bore insert is located radially away from the longitudinal axis.

9. The check valve filter assembly of claim 1, wherein the main body is formed around the bore insert such that the bore insert is positively retained in the main body.

10. The check valve filter assembly of claim 1, wherein the surface of the internal check valve bore is established by at least one of carbon fibers or glass fibers, and the bore insert overlays the fibers of the interior surface of the check valve bore.

11. The check valve filter assembly of claim 1, wherein the bore insert is formed integrally with a base, an upstanding wall, a recessed neck and a cap.

12. The check valve filter assembly of claim 1, wherein a central channel is formed through the bore insert, a mouth is defined at a lower end of the channel, the mouth connects to a beveled intermediate portion that constricts the channel toward an upper portion, and wherein a diameter of the mouth is greater than that of the intermediate portion, and a diameter of the intermediate portion is greater than that of the upper portion.

13. The check valve filter assembly of claim 1, wherein the main body is molded about the bore insert.

14. A method of forming a check valve filter assembly of an isolation cartridge of an anti-lock brake system, the method comprising:
   injecting a first material into a first mold;
   forming a bore insert through said injecting a first material into a first mold;
   removing the bore insert from the first mold;
   positioning the bore insert into a second mold;
   positioning a masking member within the second mold except for at least a portion configured to define an internal bore of a main body;
   injecting a second material into the second mold; and
   forming the main body with the embedded bore insert through said injecting a second material into the second mold.

15. The method of claim 14, further comprising removing the masking member from the main body.

16. The method of claim 15, further comprising removing the second mold.

17. The method of claim 15, wherein the first material is a first plastic, and the second material is a second plastic that differs from the first plastic.

18. The method of claim 15, wherein the first material is unfilled PA 6/6, and the second material is 20% carbon-filled PA 6/6.

19. A check valve filter assembly formed by the method of claim 14.

20. A check valve filter assembly configured to be used with an isolation cartridge of an anti-lock brake system, the check valve filter assembly comprising:
   a main body formed of 20% carbon-filled PA 6/6, said main body comprising an internal check valve bore;
   a separate and distinct bore insert formed of unfilled PA 6/6, said bore insert secured over a surface of said internal check valve bore; and a check ball retained within said internal check valve bore, wherein said bore insert is configured to sealingly engage said check ball when fluid pressure forces said check ball into said bore insert.

21. The check valve filter assembly of claim 20, wherein said bore insert comprises an insert body that conforms to said surface of said internal check valve bore, and wherein said insert body defining a central channel having a mouth that connects to a beveled intermediate portion that in turn connects to a reduced diameter portion.

22. The check valve filter assembly of claim 20, wherein said bore insert comprises an insert body defining a central channel having a mouth that connects to a reduced diameter portion.

23. A method comprising:
preventing an ABS event utilizing the check valve filter assembly of claim 20.

24. An automobile, comprising:
wheels; and
the check valve filter assembly of claim 20.

* * * * *